United States Patent [19]

Yasumatsu et al.

[11] 4,260,636

[45] Apr. 7, 1981

[54] PREPARATION OF A FERMENTED MILK DRINK

[75] Inventors: Mutsuo Yasumatsu; Kenji Katayama, both of Tokyo; Koichi Sakamoto, Omura, all of Japan

[73] Assignee: The Calpis Food Industry Co., Ltd., Tokyo, Japan

[21] Appl. No.: 880,874

[22] Filed: Feb. 22, 1978

[30] Foreign Application Priority Data

Feb. 25, 1977 [JP] Japan .................................. 52-19165

[51] Int. Cl.$^3$ ............................................... A23C 9/12
[52] U.S. Cl. ...................................... 426/34; 426/43; 426/584; 426/590; 426/522
[58] Field of Search ............... 426/580, 584, 590, 522, 426/34, 43

[56] References Cited

U.S. PATENT DOCUMENTS 3,800,052  3/1974  Inagami et al. .................. 426/590 X

OTHER PUBLICATIONS

Japanese Patent Application Publication No. 20508/74.

Primary Examiner—David M. Naff
Attorney, Agent, or Firm—Browdy and Neimark

[57] ABSTRACT

A fermented milk drink having a stable milky white appearance is prepared by adjusting the solids content and pH of a fermented milk to a solids-not-fat content of 0.5 to 2.5% and a pH of 3.00 to 3.45, heating the resultant adjusted fermented milk to a temperature above 60° C. to dissolve milk protein therein, cooling the heated fermented milk and adjusting the pH to 3.5 to 3.8, and heating the fermented milk having a pH of 3.5 to 3.8 to a temperature above 60° C. to cause re-formation of milk protein particles of relatively uniform small particle size to produce the fermented milk drink.

6 Claims, 1 Drawing Figure

PREPARATION OF A FERMENTED MILK DRINK

BACKGROUND OF THE INVENTION

The present invention relates to a method of producing a fermented milk drink by using lactic acid fermented milk as a raw material, without using any stabilizer such as pectin and gum etc., which drink is adapted for direct drinking (ready-to-drink) and in which the dispersion of milk protein and its beautiful milky white appearance are both stable for a long period.

In general, fermented milk passes across the isoelectric point (pH 4.6) of the milk protein slowly by the action of the lactic acid bacteria, differing from the case of the acid-added milk, and accordingly the milk protein particles become larger and coagulated protein is produced, so that due to these causes etc., the fermented milk becomes very likely to precipitate. Therefore, the production of drinks of such a kind that makes a good use of the taste of fermentation, particularly drinks of such a type that presents a white appearance and is adapted for direct drinking, becomes difficult.

If the milky white appearance is desired, the milk protein particle must be large; but in this case the problem of precipitation is severe. If precipitation is to be avoided by dissolving the milk protein, then the desired milky white appearance is lost. Namely, it can be said that prevention of the precipitation is contrary to the requirement of beautiful milky white appearance.

Accordingly, the production of the fermented milk drink such as the present invention has heretofore been thought very difficult, and, insofar as is known, the prior art never succeeded in attaining an object such as that of the present invention. For example, there is disclosed in Japanese Patent Application Laying-open No. 13361/74 a method for simultaneously adjusting the pH to 3.55–3.80, the acidity as lactic acid to 0.35–0.50 and the milk-solids-not-fat content to 1.35–2.65%. However, according to this method milky white can be obtained, but the precipitation which is not recognized immediately after the production becomes recognized considerably within a short period of preservation. Moreover, in Japanese Patent Application Publication No. 20508/74, there is disclosed a method in which the fermented milk is made so as to have a pH below 3.5 and heated at a temperature above 60° C., and thereafter microorganism and denatured protein are removed by means of a centrifugal separator and the like thereby producing a stable fermented milk drink. According to this method, on the contrary to said Japanese Patent Laying-open No. 13361/74, a drink which does not cause the precipitation for a long period can be obtained, but it has a very weak milky white and it becomes rather a transparent drink.

From the study of the characteristics of the prior art such as described above it has been found that the present status is such that in these prior art methods, although the consideration is paid for making the dispersion property of milk protein better, the former method retains the milky white appearance brought about by the milk protein particles produced by the passing-across of the isoelectric point as the milky white appearance of the final product at the sacrifice of stable dispersion of milk protein, while the latter method retains stability of the milk protein particles produced by the passing-across of the isoelectric point at the sacrifice of the production of a sufficient milky white appearance. Moreover, it has also been found that the size of the milk protein particles produced by the passing-across of the isoelectric point covers a wide range from smaller one to considerably large one. Accordingly, the prior art methods have a drawback that if it is wanted to maintain the milky white, the larger particles are precipitated, and on the other hand, if it is wanted to prevent the precipitation, the particles are made too fine or the larger particles are removed outside the system thereby resulting in disappearance of the milky white.

BRIEF SUMMARY OF THE INVENTION

Therefore, the present inventors have studied for obtaining a method different from the prior arts such as described above and as a result have succeeded in obtaining such a drink that the dispersion of milk protein and the beautiful milky white appearance are both stable for a long period. This is accomplished as follows: the fermented milk presenting the milky white appearance produced by the passing-across of the isoelectric point is once dissolved into the state showing a strong transparence and thereafter the pH of the resulting solution is increased and then the solution is heated thereby producing milk protein particles from the dissolved state. It has also been found that the milk protein particles formed according to the present invention are not passed back across the isoelectric point and its grain size is uniform and not too large and also not too small and is such that is suitable to present a stable dispersion and a beautiful milky white appearance. This feature will be explained again in relation with the experimental example hereinafter. The milk protein particle which grain size is such one that is suitable to present a beautiful milky white appearance, referred to in the present invention, contributes both to the palatability and the deliciousness of the drink.

It is an object of the present invention to provide a fermented milk drink, which is adapted for direct drinking and is stable for a long period and in which dispersion of milk protein is remarkably increased.

It is a second object of the present invention to provide a delicious fermented milk drink in which its beautiful milky white appearance is stable for a long time period.

It is a third object of the present invention to provide a fermented milk drink in which dispersion of milk protein is increased without using any special stabilizer.

It is a fourth object of the present invention to provide a fermented milk drink in which a degree of whiteness of fermented milk can be changed to the desired whiteness.

It is a fifth object of the present invention to provide a fermented milk drink in which pasteurizing or sterilizing treatment can be carried out at the same time as the heating treatment for giving a milky white appearance.

DETAILED DESCRIPTION OF THE INVENTION

Figure 1:
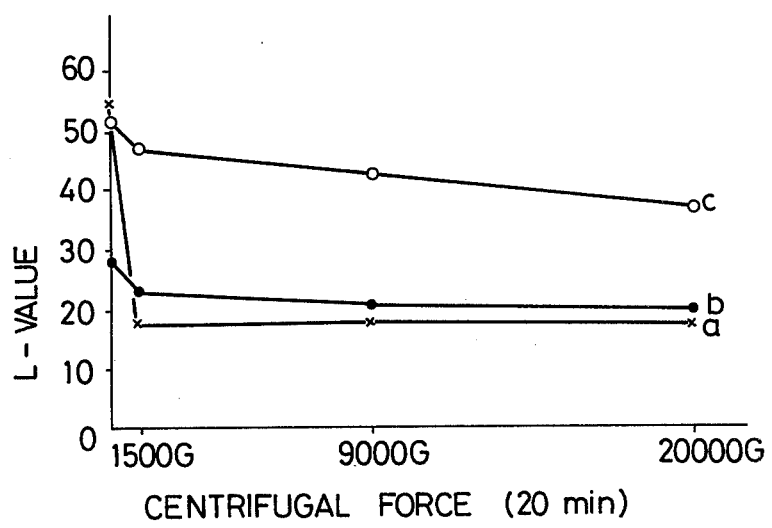
FIG. 1 is a diagrammatic view for comparison showing the degree of the milky white and its stability relating to the samples (milk protein dispersed solution) obtained by the method (c) of the present invention and other methods (a) and (b), which was applied with a centrifugal force.

The present invention is characterized by the steps comprising a step of dissolving milk protein so as to have an L-value below 35, which is measured by means of a color-difference meter, by subjecting fermented milk, being diluted with water according to requirements, to pH adjustment and heating, and a step of forming milk protein particles so as to have an L-value between 40 and 57 by addition of pH adjusting agent and heating.

The L-value referred to in the present invention is one that designated whiteness (lightness) of a tested body by means of a conventional color-difference meter, and it shows that the larger the value is, the stronger the whiteness is. The measurement of L-value in the present invention is carried out under the following conditions: liquid thickness 30 mm, sample illumination area 30 mm$\phi$, reflectance measurement.

Hereinafter, the present invention will be explained in detail.

The fermented milk is prepared by a conventional lactic acid fermentation using skim milk, powdery skim milk and condensed skim milk etc. as a raw material. In the preparation thereof, when a sufficient fermentation taste has been obtained, the fermentation may be stopped halfway and an edible acid may be added further. Also, since the fermented milk generally forms a curd, in order to make the subsequent treatment easy, a usual homogenizing treatment may be carried out appropriately. However, it is also a characteristic of the present invention that even if the homogenizing treatment is not carried out, a drink of the object of the present invention can sufficiently be produced. Next, the milk protein is dissolved so that the fermented milk has a L-value below 35 by, water dilution according to requirements, pH adjustment and heating. The dissolution called in the present invention means such a condition where the milk protein is minutely dispersed in the state that the electric charge of the milk protein is almost in the positively charged state thereby making the L-value of the fermented milk below 35 thus resulting in the state of a strong transparence. It has the appearance of a soap solution. This dissolving treatment comprises the following, namely, diluting the fermented milk with water according to requirements in order to make the coagulated protein and the larger milk protein particles apt to be dispersed and dissolved, and, making the pH acidic below 3.45 in order to heighten the dispersion and dissolution, and heating it in order to heighten the molecular movement and make the dissociation, the dispersion and dissolution sufficient. The lactic acid fermented milk made from the usual skim milk can be obtained in the state in which it is not so much diluted with water, namely the milk-solids-not-fat content is above 5 W/W % (hereinafter, % means W/W%) in view of economy of fermentation tank and so forth. This fermented milk is diluted with water into the milk-solids-not-fat content below 2.5%. However, if the fermented milk is such one that is obtained by fermenting the skim milk containing the milk-solids-not-fat content below 2.5%, it is unnecessary for the skim milk to be diluted. If it is diluted to below 0.5%, taste as a drink becomes weak or beautiful milky white becomes difficult to be presented, so that such dilution is not preferable. And such a fermented milk that contains more than 2.5% of that content is not preferred, because it is easy to allow the milk protein to precipitate. In the case of the fermented milk drink used for direct drinking, a concentration of milk-solids-not-fat content of 0.5–2.5% is suitable to give a refreshing taste. Also, in the case of use of water for the dilution, a water previously appropriately added with sugar and acid etc. may be used as water. The pH is preferably set below 3.45. However, if the pH is set below 3.00, the acidity of the final product becomes too strong, or due to the addition of a pH adjusting agent, which is a treatment after the heating, salts becomes too much, with the result that the taste is spoiled or the precipitation becomes apt to be caused, so that said pH value is not preferable. And unless the pH is set below 3.45, it is difficult for the milk protein to be sufficiently dissolved. In general, when the lactic acid fermented milk is diluted with water in order that said milk contains below 2.5% of the milk-solids-not-fat content, the pH is below 3.45, but if the acid production is insufficient, the pH is regulated by appropriate addition of an edible acid such as lactic acid, citric acid, phosphoric acid and so forth. The treatment order of the water dilution and the pH adjustment is not specified. The water dilution may be utilized as the pH adjustment at the same time. The fermented milk, which satisfies the above described two conditions of the milk-solids-not-fat content and the pH value by the water dilution is heated at a temperature above 60° C. to dissolve the milk protein. From the examination of the degree of such dissolution by the experiments carried out repeatedly, it has been found that it is necessary to make the L-value below 35, preferably below 30, in order to produce a drink with milky white and stable dispersion of milk protein. In the case that the L-value is above 35, the final product becomes apt to precipitate. Relating to the heating above 60° C., the heating at a temperature between 90° and 100° C. is more preferable in consideration of increasing of the dissolubility and the better economy of the equipments, but it is possible to attain the purpose even by the heating above 100° C. What is essential is that a heating condition by which the L-value is made below 35 is set in accordance to individual cases, for example, in the case of milk-solids-not-fat content of 0.5%, pH of 3.3 and application of a 90° C. reaching-temperature heating (this means such a heating that after reaching 90° C., cooling is immediately commenced.), the L-value is about 19. In the case of milk-solids-not-fat content of 1.0%, pH of 3.3 and application of heating at a temperature of 80° C. for 5 secs., the L-value is about 24. In the case of milk-solids-not-fat content of 1.6%, pH of 3.4 and application of a heating at a temperature of 90° C. for 5 secs., the L-value is about 28. In the case of milk-solids-not-fat content of 2.0%, pH of 3.1 and application of a 95° C. reaching-temperature heating, the L-value is about 27. Relating to the degree of the L-value below 35, it is preferable below 30. The purpose of the present invention can sufficiently be attained by the L-value about between 35 and 17.

As described above, the fermented milk can be obtained in which the milk protein is regulated into the dissolved condition. Namely, it is necessary that before being subjected to the next addition treatment of a pH controlling agent, the fermented milk is previously made in such a dissolved condition that has a L-value below 35 and shows a strong transparence.

In the next step, the milk protein particles are formed so as to have a L-value between 40 and 57 by addition of the pH adjusting agent and the heating of the fermented milk which has been regulated into the dissolved condition having a L-value below 35. As the pH adjusting agent, there may be named alkali agents such as sodium carbonate, sodium hydroxide, sodium lactate, sodium citrate, sodium phosphate and so forth and their solutions or milk protein and its solution (skim milk etc.) and so forth. Such an agent that can move the pH to the side of alkali may be appropriately utilized. By addition of a pH adjusting agent, the pH of the fermented milk having a pH below 3.45 is made between 3.50 and 3.80. The fermented milk which has only been regulated so as to have a pH between 3.50 and 3.80 is approximately in the same dissolved condition or external appearance as that obtained before addition of the pH controlling agent. Namely, the milk protein particles of sufficiently large size can not be produced and milky white can not appear by only changing the pH to between 3.50 and 3.80. When it is subjected to the heating treatment subsequent to said addition of the pH controlling agent, the milk protein particles can be produced which have the good uniformity of size, namely in which the degree of unevenness in individual particle size is low and which have an appropriate size, with the result that the beautiful milky white is presented. If the adjusted pH is below 3.50, even if the heating is subsequently applied, the milky white can not often be produced, and if the pH is above 3.80, even if the milky white is presented, the milk protein becomes apt to precipitate and accordingly it is difficult to produce a drink which is stable for a long period, so that such a pH value is not desirable. Moreover, this pH value between 3.50 and 3.80 gives a sourness which is suitable as a drink used for direct drinking. The fermented milk which has been subjected to the pH adjustment by addition of the pH adjusting agent is subsequently heated. Owing to this heating treatment, the milk protein which has been in the dissolved condition till then is again collected so that the minute particles of a uniform and appropriate size are formed, resulting in presenting beautiful milky white appearance. This heating treatment may be utilized as a sterilizing treatment at the same time. The heating for producing the milky white appearance is preferably performed at a temperature above 60° C. If using a temperature below 60° C., it takes too long time for the formation of the milk protein particles or the formation of the particles is impossible. The heating may be carried out at a temperature above 100° C. By carrying out the heating for several minutes, the milky white can be sufficiently presented. In general, the lower the heating temperature is, the longer the required heating time is. For example, in the case of a milk-solids-not-fat content of 1.0%, a pH of 3.7, a 60° C. reaching-temperature heating and a degree of milky white of about 40 by L-value, the L-value becomes about 50 by the heating at 60° C. for thirty minutes, and becomes about 55 by the heating at 70° C. for ten minutes. A desired degree of milky white can be attained by setting the heating temperature and heating time in accordance with individual case. The beautiful milky white in the present invention means such one that has a L-value above 40. There may be such a case that due to a cause such as a too long heating time etc. the L-value becomes very high, but if it is too high, the milk protein particles are apt to cause coagulation or precipitation. Accordingly, the L-value can be used as an index of the dispersion stability of the milk protein particles. In this sense, in the present invention the upper limit of the milky white is set to a L-value of 57, preferably 55, in order to produce a drink with milky white appearance and stable dispersion of milk protein. Accordingly, in order to produce a fermented milk drink according to the present invention, it is essential that the L-value is finally between 40 and 57, and therefore for attaining this requirement the various conditions and treatments of the above described steps are selected and set in accordance with a degree of the milky white appearance to be finally aimed at.

The drink being stable for a long period, referred to in the present invention, means such one that even after it has been preserved for about three months to six months at a room temperature after having been subjected to pasteurization or sterilization and filling-up in a bottle, there is no misty precipitation on the bottom of the bottle and as well there is not recognized so-called liquid-separation state in which the upper portion of the liquid becomes transparent.

Moreover, it is possible to appropriately add sweetening agent, flavoring agent, or carbonic acid gas etc. in any one of the steps in order to finish a tasty fermented milk drink. And a colored drink added with fruit juice and coloring agent etc. can be also prepared by utilizing this invention. In this case, the L-value of the drink which has been already added with fruit juice and coloring agent is not always set to such L-value specified according to the present invention as above mentioned.

Hereinafter the present invention will be explained concretely according to experimental example and practical examples.

Experimental example

A skim milk was cooled to 37° C. after having been subjected to the pasteurization by heating at 90° C. for 15 secs., and this was added with 3.0% of a starter of Lactobacillus bulgaricus thereby causing the fermentation and thus a fermented milk of pH of 3.30 was obtained. This fermented milk was uniformly agitated and then subjected to each of three kinds of the following treatments: Method (c) is that of the present invention.

Method (a): A fermented milk was added with water and thereby the fermented milk (pH 3.40) of milk-solids-not-fat content of 2.0% was obtained in an amount of 30 kg. The pH of the resultant fermented milk was adjusted to 3.60 by addition of 5% sodium carbonate aqueous solution, and subjected to heating at 90° C. for 5 secs. and immediately thereafter heat-filled in bottles of 200 ml. The L-value of the final solution was 54.

Method (b): A fermented milk was added with water and thereby the fermented milk of milk-solids-not-fat content of 5.0% was obtained in an amount of 30 kg. The resultant fermented milk was homogenized in 150 kg/cm$^2$, and the pH was adjusted to 3.00 by the use of phosphoric acid and thereafter subjected to the 80° C. reaching-temperature heating. The resultant L-value was 52. After the heating treatment, it was treated by a centrifugal separation of 1,100 G (2,500 rpm, 30 minutes) thereby removing micro-organism and denatured protein, and the pH of the liquid (L-value 44) after the removal of these was adjusted to 3.40 by the use of 10% sodium hydroxide aqueous solution and added with water thereby making 75 l in volume, and subjected to heating at 90° C. for 5 secs., and immediately thereafter heat-filled in bottles of 200 ml. The L-value of the final solution was 28.

Method (c): In the same manner as the method (a) the fermented milk of milk-solids-not-fat content of 2.0% was obtained in an amount of 30 kg. The resultant fermented milk was added with 50% lactic acid aqueous solution thereby adjusting the pH to 3.20 and thereafter the milk protein was dissolved by heating at 95° C. for 5 secs. The L-value was 27. Next, the pH was regulated to 3.60 by the use of 5% sodium carbonate aqueous solution, and it was subjected to the heating treatment at 90° C. for 5 secs. and immediately thereafter heat-filled in bottles of 200 ml. The L-value of the final solution was 52.

The samples were prepared by the above three methods. The results of measurement of the L-value and the results of preservation of the dispersion property of milk protein of the products in each of said methods are shown in Table 1. The results of preservation are shown relating to such ones that has been left at a room temperature for six months.

TABLE 1

| Model | (a) | (b) | (c) |
|---|---|---|---|
| L-value after primary heating | / | 52 | 27 |
| L-value after centrifugal separation | / | 44 | / |
| L-value after final heating (final solution) | 54 | 28 | 52 |
| Dispersion property of milk protein after preservation | ## | — | — |

(note)
... The precipitation is very much.
— ... The precipitation is none or little.

Moreover, in order to know the dispersion condition of the milk protein immediately after the production, the solution was subjected to a centrifugal separator with various centrifugal forces G applied to remove the precipitation, and the L-values of the liquids after the removal of the precipitation were measured and the results are shown in FIG. 1. From the Table 1, the essential difference between the method (c) according to the present invention and other methods can be seen obviously, namely it is possible to obviously see in comparison whether the milk protein particles are once dissolved (into a L-value below 35) and thereafter the particles which are of sufficient large and uniform size are again formed thereby resulting in presenting milky white (having a L-value between 40 and 57), or not. Also, from FIG. 1, it is possible to compare the degree of milky white of the final solution produced by each of said methods and its stability, namely the stability of dispersion of the milk protein respectively. In this case, it is seen that the L-value decreases with increasing the centrifugal force G, and this is due to the precipitation of the milk protein. Accordingly, it can be said that in the case having a L-value which is greatly decreased, namely in the method (a), the larger particles which are apt to precipitate are included unevenly.

As is obvious from Table 1 and FIG. 1, in the method (a), immediately after the production a sufficient milky white can be obtained, but this method is not such one that the milk protein particles are again formed after once dissolved as is in the present invention, so that the milk protein particles comprise various particles of larger and smaller sizes, and since there are many particles of comparatively rough size, the dispersion property of the milk protein particles is bad and the precipitation is much. With increasing the precipitation, the L-value after the preservation becomes poor (lower) compared with that immediately after the production. In the method (b), as is obviously seen from Table 1 and FIG. 1, the dispersion property of the milk protein of the final solution is stable, but since the formation of the milk protein particles is not carried out as is in the present invention, the final product does not present the milky white appearance and it can only be said that it resembles so-called soap solution. Moreover, in the case of the method (b), since considerably large amount of the milk protein is removed by the centrifugal separation in the production step, the loss of the milk protein is large. In the case of the present invention, the method (c), as is apparent from Table 1 and FIG. 1, it can be seen that there are uniformly formed the particles which are difficult to precipitate and of such a size that is suitable for presenting a beautiful milky white appearance.

Practical example 1

The lactic acid fermented milk which was the same as that in the experimental example was obtained. 10 kg of this fermented milk was added and mixed with 60 kg of water, and then the resultant solution was regulated to a pH of 3.30 by the use of 50% lactic acid aqueous solution and thus the fermented milk of milk-solids-not-fat content of 1.2% was obtained. This was subjected to the 90° C. reaching-temperature heating and cooled to a room temperature (L-value 22.0), and thereafter regulated to a pH of 3.70 by the use of 10% sodium citrate aqueous solution. Subsequently, 1 kg of the fermented milk having a pH of 3.70 was added and mixed with 100 g of sucrose and 0.5 g of lemon flavoring agent and subjected to the 90° C. reaching-temperature heating for pasteurization thereby obtaining a fermented milk drink. The L-value of the drink was 50.5. Even after the preservation for six months at a room temperature, the dispersion of the milk protein was stable and it presented a beautiful milky white appearance.

Practical example 2

The lactic acid fermented milk which was the same as that in the experimental example was obtained. 6.5 kg of this fermented milk was added and mixed with 5.5 kg of sucrose, 15 g of citric acid and 38 kg of water, and the fermented milk was adjusted to a pH of 3.40 and subjected to the 95° C. reaching-temperature heating, and cooled to a room temperature (L-value of 24.0), and thereafter added with skim milk to regulate the pH to 3.63 and then added with 0.05% of lemon flavoring agent and subjected to the heating pasteurization at 80° C. for 15 minutes thereby obtaining a fermented milk drink. The L-value of the drink was 50.3. Even after the preservation for six months at a room temperature, the dispersion of the milk protein was stable and it presented a beautiful milky white appearance.

Practical example 3

The lactic acid fermented milk which was the same as that in the experimental example was obtained by the use of a powdery skim milk. This fermented milk was added with water so as to have a milk-solids-not-fat content of 1.6%, and 10 kg of the resultant fermented milk was added with 50% lactic acid aqueous solution to adjust the pH to 3.42, and thereafter added and mixed with 1 kg of sucrose and 5 g of lemon flavoring agent, and then heated at 110° C. for about 5 secs. by means of a tubular type heat exchanger. The liquid was cooled to a room temperature (L-value 28.6) and thereafter regulated to a pH of 3.75 by the use of 5% sodium carbonate aqueous solution and subjected to the 65° C. reaching-temperature heating thereby obtaining a fermented milk drink. The L-value of the drink was 45. In this example, after the heating at 110° C., the treatment was carried out under the aseptic condition. Even after the preservation for six months at a room temperature, the dispersion of the milk protein was stable and is presented a beautiful milky white appearance.

What is claimed is:

1. A method of producing fermented milk drink comprising dissolving milk protein in fermented milk to provide an L-value below 35 by subjecting fermented milk, having a non-fat milk solids content of 0.5–2.5% and a pH of 3.00–3.45, to heating at above 60° C.; and then forming milk protein particles to provide an L-value of 40–57 by adding a pH adjusting agent to provide a pH of 3.5–3.8 and heating at above 60° C.

2. A method according to claim 1, in which said milk protein is dissolved so as to have an L-value below 30, and said milk protein particles are formed so as to have an L-value between 40 and 55.

3. A fermented milk drink product according to the method of claim 1.

4. A fermented milk drink product according to the method of claim 2.

5. In a method of producing a fermented milk drink comprising providing fermented milk, adjusting the pH of the fermented milk, and heating, the improvement comprising:
   adjusting the solids content and pH of the fermented milk to provide a milk-solids-not-fat content of 0.5–2.5% and a pH of 3.00–3.45;
   heating the so adjusted fermented milk to a temperature above 60° C. to dissolve the milk protein;
   cooling the resultant product and adjusting the pH to a value between 3.5 and 3.8; and
   heating the fermented milk product of pH 3.5–3.8 to a temperature above 60° C. to cause re-formation of milk protein particles of relatively uniform small particle size, the product having a stable, beautiful milky white appearance.

6. A stable fermented milk drink produced according to the method of claim 5.

* * * * *